United States Patent [19]

Aschenbruck et al.

[11] Patent Number: 5,463,812
[45] Date of Patent: Nov. 7, 1995

[54] PROCESS FOR TENSIONING AND LOOSENING TENSION RODS IN MULTICOMPONENT, ASSEMBLED GAS TURBINE ROTORS

[75] Inventors: Emil Aschenbruck, Duisburg; Reinhold Rohrbacher, Oberhausen, both of Germany; Alain Moreau, Le Chesnay; Michel Guillaux, Montigny les Cormeilles, both of France

[73] Assignee: Man Gutehoffnungshutte AG, Oberhausen, Germany

[21] Appl. No.: 155,581

[22] Filed: Nov. 19, 1993

[30] Foreign Application Priority Data

Nov. 19, 1992 [DE] Germany .................. 42 38 922.4

[51] Int. Cl.$^6$ .................................................. B23P 15/00
[52] U.S. Cl. ................ 29/889.21; 29/889; 29/889.1; 29/428
[58] Field of Search ........................ 29/889, 889.21, 29/889.2, 889.1, 428

[56] References Cited

U.S. PATENT DOCUMENTS

| | | | |
|---|---|---|---|
| 4,118,847 | 10/1978 | Mansson et al. | 29/889.2 |
| 4,586,225 | 5/1986 | Bouiller et al. | 29/889.2 |
| 4,590,653 | 5/1986 | Ades et al. | 29/889.2 |

*Primary Examiner*—Irene Cuda
*Attorney, Agent, or Firm*—McGlew and Tuttle

[57] ABSTRACT

A process and a device for the simultaneous tensioning and loosening of eccentric tension rods (19) of gas turbine rotors assembled from several turbine disks (23). An improved hydraulic tensioning device is used to provide an optimal circular and flat impact quality, and the quiet running of the gas turbine rotor is improved overall at high speeds. Further, it is guaranteed that the same forces act on each tension rod (19), the elongation of each tension rod (19) can be measured as accurately as possible, and a minimization of the setting force losses is achieved. A solid cylindrical ring (1) forms a piston chamber (11) in each case, whereby the piston chambers (11) are connected together with cross holes and are acted on by the hydraulic medium. The catch pin (3), through which a measuring rod (5) is guided, which makes contact with the head of the tension rod (19) by a pressure spring (18), is inserted through a boring in the piston (2). The dial gauge plate (16) is attached with the knurled nut (15), and the dial gauge feet (17a) of the dial gauge (17) are in contact with the measuring rod (5a).

2 Claims, 3 Drawing Sheets

5,463,812

PROCESS FOR TENSIONING AND LOOSENING TENSION RODS IN MULTICOMPONENT, ASSEMBLED GAS TURBINE ROTORS

FIELD OF THE INVENTION

The present invention pertains to a process for tensioning and loosening tension rods of multicomponent, assembled gas turbine rotors with a hydraulic tensioning device, as well as the tensioning device for carrying out the process.

BACKGROUND OF THE INVENTION

Hydraulically actuated tensioning components are used to tighten tools or workpieces.

A hydraulic tensioning ring is known, for example, in which several pistons are arranged in cylindrical borings, whereby the pistons exert a tensioning pressure on a workpiece or tool that rotates with the axis.

Also known is an arrangement of several anchor screws, which are connected in series and are acted on by pressure via a flow pipe, whereby the pressure can be read on a manometer.

SUMMARY AND OBJECTS OF THE INVENTION

It is an object of the present invention to provide a process and to provide an improved tensioning device, such that its use is made possible in gas turbine rotors with a disk construction. The following should thus be achieved:

an optimal circular and flat impact quality, that exactly equal forces act on each tension rod, that the elongation of each tension rod can be measured accurately, that the quiet running of the gas turbine rotor is improved overall at high speeds, that a minimization of the setting force losses is obtained, that no torsional forces act on the tension rod during the tensioning and loosening process, that no unbalanced bearing forces act on the turbine disks, and that a simple, safe and rapid handling is achieved in the assembly/disassembly.

According to the invention, a process is provided for tensioning and loosening tension rods of a multicomponent, assembled gas turbine rotors including a hydraulic tensioning device. Defined elongations and pretensioning forces are obtained by means of a combined, isochronic, uniform pretensioning in the case of several tension rods which are arranged eccentrically on gas turbine rotors. The final assembly of the gas turbine rotors includes a tensioning process comprising building up pressure with the hydraulic tensioning device to extend the tension rods or elongate the bolts or the tension rods. The tension rods are subsequently tightened. The tightened tension rods are then stressed by means of pressure reduction. Disassembly of the gas turbine rotor includes a combined isochronic, uniform loosening process including building up pressure in the hydraulic tensioning device for elongation of the bolts or tensioning rod, loosening of the tension rod nuts and tightening of the bolts or the tension rods by means of tension reduction whereby high pressure medium is admitted into all piston chambers of the hydraulic tensioning device via cross holes in a solid ring for each of the tensioning or loosening process of the bolts or tension rod and elongation is measured directly and isochronically on all bolts or tension rods via a spring loaded measuring rod located in a catch pin, which measuring rod transfers the change in length directly to a dial gauge.

The hydraulic tensioning device includes hydraulic tensioning means including a plurality of hydraulic tensioning devices arranged eccentrically on a surface of a gas turbine rotor. Tensioning means provides a combined simultaneous and uniform tensioning and loosening. Piston chambers are provided within a solid cylindrical ring wherein each piston chamber is joined together by means of horizontally arranged cross holes with integrated piston, bearing rings and seals. A catch pin is provided having a central boring through which a measuring rod is guided. A pressure spring is attached to a lower end of the measuring rod.

Compared to the prior-art device, the improved hydraulic tensioning device, which is tailor-made for the purpose of special applications, has the following improvements:

Several eccentrically arranged tension rods can be tensioned simultaneously and uniformly.

The elongation is measured directly and simultaneously on all of the tension rods.

The solid cylindrical ring with integrated pistons, bearing rings and seals forms a piston chamber, whereby all piston chambers are connected to one another by means of cross holes, and are simultaneously acted on by the hydraulic medium when tensioning or loosening the eccentric tension rods.

Additional safety catch pins are not necessary.

By means of using a spring-loaded measuring screw on the end of the measuring rod, the measuring rods lie directly on the tension rod.

The centered tensioning device is located directly on the shaft end of the gas turbine rotor.

The eccentrically arranged tension rods are tensioned by means of the hydraulic tensioning device during the assembly of the gas turbine rotor, and the tensioned tension rods are loosened during disassembly.

Corresponding to the process according to the present invention, the process for tensioning the tension rod includes the following steps:

elongation of the tension rod by means of pressure build-up, tightening of the tension rod nuts, stress of the tension rod nuts by means of pressure reduction.

The process for loosening the tension rod involves:

elongation of the tension rod by means of pressure build-up, loosening of the tension rod nuts, tightening of the tension rod by means of pressure reduction.

The course of the tensioning and loosening process is reproduced by means of extension measurements and can be read directly on the dial gauges for each tension rod.

Each of the eccentrically arranged tensioning devices according to the present invention are formed of a cylindrical ring, in which a pressure piston is inserted from above. Bearing rings with seals are used for sealing and form thereby a surrounding piston chamber, on which the pressure medium acts. The pressure piston has a central boring, through which the catch pin is inserted. This pin has, on the upper end, a screw thread, onto which a hexagonal nut is screwed.

The lower end of the catch pin is equipped with an inner screw thread. By means of this, the catch pin is screw-connected with the tension rod to be tensioned.

The catch pin has a central boring, through which a spring-loaded measuring rod is guided. During the tensioning and loosening process, the measuring rod is pressed onto the head of the tension rod.

The hydraulic tensioning device is arranged on the flange of the shaft of the gas turbine rotor and is fixed by means of a lock nut. The dial gauge plate is arranged on the tensioning device such that the dial gauge feet of the dial gauge touch the measuring rod, and the measuring plate is fastened by means of a knurled nut.

By means of the connection of both connections for forward and backward motion, which are located on the cylindrical ring, all pistons are hydraulically connected with one another and are connected to a high-pressure pump.

For the actual tensioning process, the piston chambers of the annular tensioning device are acted on by the corresponding pressure.

In the tensioning process, the tension rods are extended corresponding to the tensioning force. In this case, the pistons move out of the cylindrical ring.

As another step of the process, in parallel to the tensioning or loosening process, an extension measurement of the tension rod is carried out, whereby the extension is measured directly via a spring-loaded measuring rod located in the catch pin.

The increase in extension can be read directly on the dial gauge for each tension rod.

At the end of the tensioning or loosening process, a determination of the setting force losses in the tension rods due to repeated tensioning and loosening of the tension rods is carried out, since an elastic relaxation and a settling of the material occurs during the pressure reduction.

The extending force drops because elastic or plastic deformations are produced on the contact surfaces of the locking nuts by means of the new flow of force.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
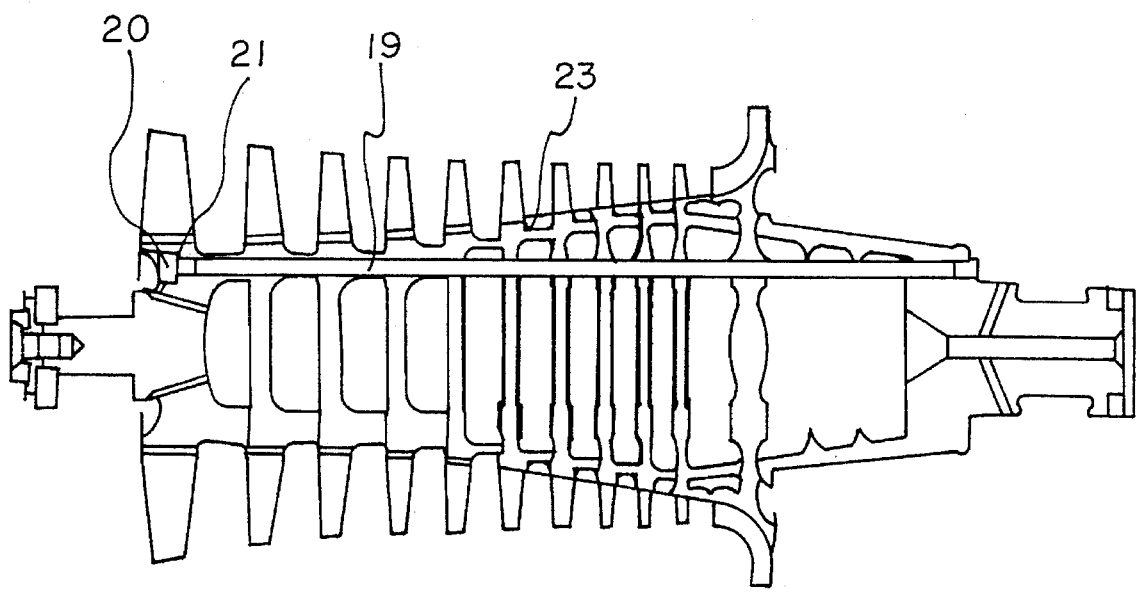
FIG. 1 is a sectional view through the rotors of a gas turbine rotor, which are assembled from several segments.

FIG. 1 shows a section through the rotors of a gas turbine, which is held together by means of eccentric tension rods 19, the rotors being assembled in a disk construction from several segments (turbine disk 23).

The tension rods 19 are tensioned by means of a tension rod nut 20 with safety plates 21 lying between then.

Figure 2:
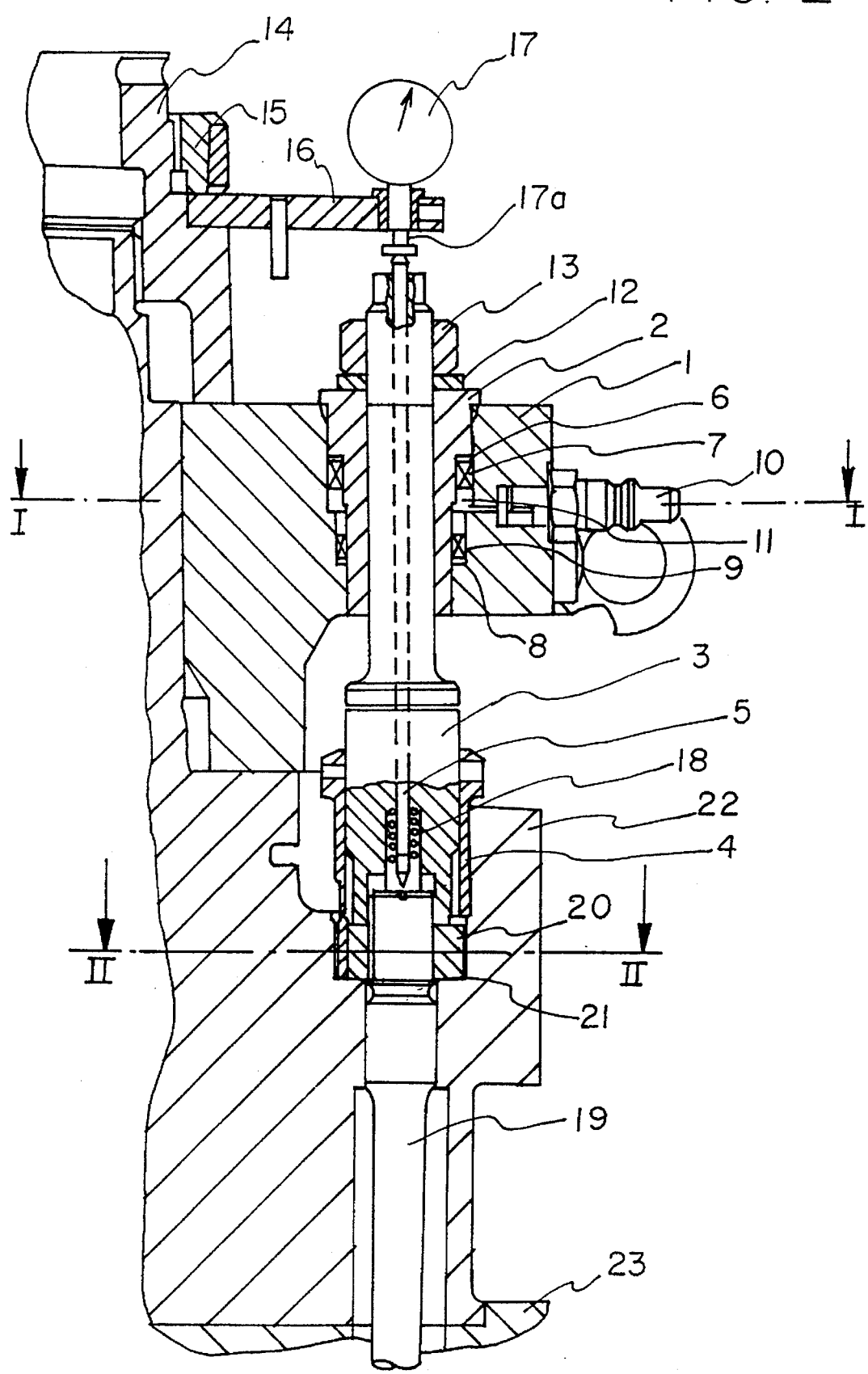
FIG. 2 is a sectional view through the hydraulic tensioning device with tensioned tension rod and dial gauge.

FIG. 2 shows the hydraulic tensioning device, whose cylindrical ring 1 is arranged on the shaft flange 22 and is supported via a lock nut 14. Pistons 2 are inserted in the cylindrical ring 1. A piston chamber 11, which is delimited above and below by bearing rings 6, 8 with corresponding seals 7, 9, is formed in the interior of the cylindrical ring 1. The piston chambers 11 are connected together by means of cross holes 1a (see FIG. 3).

The piston chambers 11 are acted on by the hydraulic medium via the plug-type fitting 10. The catch pin 3, which is held by means of a hexagonal nut 13 with a plain washer 12, is inserted through a boring in the piston 2.

The measuring rod 5, which makes contact with the head of the tension rod 19 with a pressure spring 18, is guided through the central boring of the catch pin 3.

Claw nuts 4 are arranged displaceably on the catch pin 3 and are easily secured on the upper edge by means of a ball index.

The dial gauge plate 16 is attached with the knurled nut 15, and the dial gauge feet 17a of the dial gauge 17 are in contact with the measuring rod 5.

Figure 3:
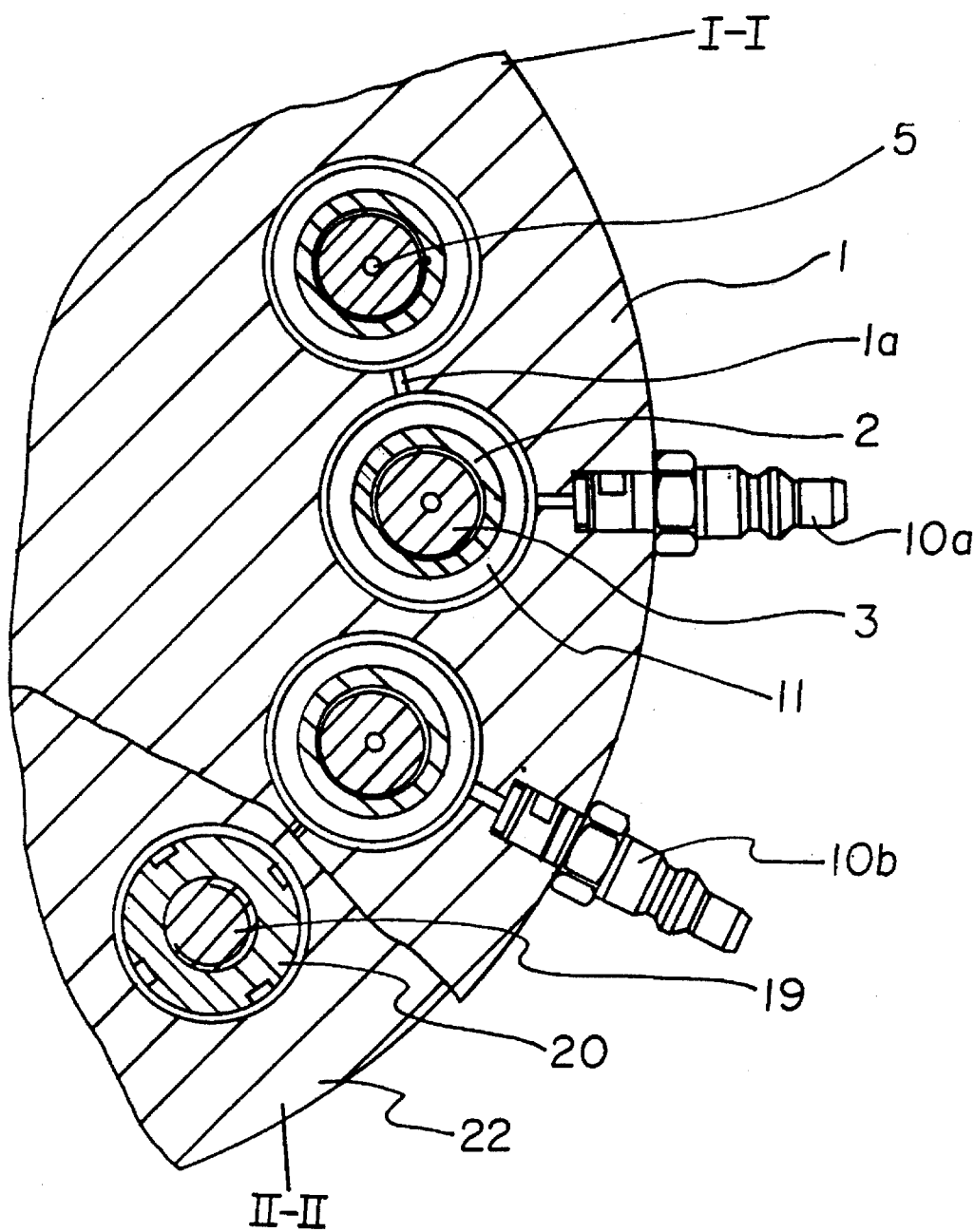
FIG. 3 is a top view of the hydraulic tensioning device corresponding to section I—I and section II—II of FIG. 2.

Two sections of FIG. 2 are shown in FIG. 3. Section I—I shows a top view in the area of the cylindrical ring 1, whereby the catch pin 3 is guided centrally through the piston 2 with the measuring rod 5 lying on the inside. The piston chamber 11, which is acted on by the hydraulic medium via the forward motion fitting 10a, is recognized between the piston 2 and the cylindrical ring 1. The piston chambers 11 are connected quasi in series by means of the cross holes 1a, such that the hydraulic medium can flow from one piston chamber 11 to another piston chamber 11. The hydraulic medium is again carried away via a backward motion fitting 10b.

Section II—II shows a top view of the tension rod nut 20, which is screwed onto the tension rod 19 and lies on the shaft end 22 of the gas turbine rotor.

While a specific embodiment of the invention has been shown and described in detail to illustrate the application of the principles of the invention, it will be understood that the invention may be embodied otherwise without departing from such principles.

| APPENDIX | |
|---|---|
| Reference List: | |
| 1 | Cylindrical ring |
| 1a | Cross holes in 1 |
| 2 | Piston |
| 3 | Catch pin |
| 4 | Claw nuts |
| 5 | Measuring rod |
| 6 | Upper bearing ring |
| 7 | Seal |
| 8 | Lower bearing ring |
| 9 | Seal |
| 10 | Plug-type fitting |
| 10a | Forward motion fitting |
| 10b | Backward motion fitting |
| 11 | Piston chamber |
| 12 | Plain washer |
| 13 | Hexagonal nut |
| 14 | Lock nut |
| 15 | Knurled nut |
| 16 | Dial gauge plate |
| 17 | Dial gauge |
| 17a | Dial gauge feet |
| 18 | Pressure spring |
| 19 | Tension rod |

-continued

APPENDIX

Reference List:

| | |
|---|---|
| 20 | Tension rod nut |
| 21 | Safety plate |
| 22 | Shaft flange |
| 23 | Turbine disk |

What is claimed is:

1. A process for tensioning and loosening tension rods of multicomponent, assembled gas turbine rotors with a hydraulic tensioning device including several tension rods arranged eccentrically on the gas turbine rotors, the tension rods having nuts the process comprising the steps of:

providing the hydraulic tensioning device with piston chambers within a solid cylindrical ring, said piston chambers being connected via cross holes;

providing a spring loaded measuring rod located in a catch pin connected to the tensioning rod, the measuring rod being connected to a dial gauge;

for final assembly of the gas turbine rotor, tensioning including:

elongation of the tension rods by building up pressure in the hydraulic tensioning device;

tightening the nuts of the tension rods; and stressing the nuts of the tension rods by reduction of pressure in the hydraulic tensioning device;

disassembling the gas turbine rotor by a combined isochronic uniform loosening including elongation of the tension rods by means of pressure build-up;

loosening the nuts of the tension rods; and tightening the tension rods by means of pressure reduction;

measuring elongation directly and isochronically on all tension rods via said spring loaded measuring rod, which measuring rod transfers a change in length directly to said dial gauge.

2. A process according to claim 1, wherein:

at an end of said tensioning or loosening, a determination is made of setting force losses in the tensioning rods of the gas turbine rotor due to repeated tensioning and loosening of the tension rod.

* * * * *

UNITED STATES PATENT AND TRADEMARK OFFICE
CERTIFICATE OF CORRECTION

PATENT NO. : 5,463,812

DATED : November 7, 1995

INVENTOR(S) : ASCHENBRUCK et al.

It is certified that error appears in the above-identified patent and that said Letters Patent is hereby corrected as shown below:

On the title page, correct item

[73] Assignee: MAN Gutehoffnungshütte AG, Oberhausen, Germany

Signed and Sealed this

First Day of October, 1996

Attest:

BRUCE LEHMAN

Attesting Officer

Commissioner of Patents and Trademarks